United States Patent

[11] 3,621,908

| [72] | Inventor | Milton F. Pravda<br>Baltimore, Md. |
|---|---|---|
| [21] | Appl. No. | 69,729 |
| [22] | Filed | Sept. 4, 1970 |
| [45] | Patented | Nov. 23, 1971 |
| [73] | Assignee | Dynatherm Corporation<br>Cockeysville, Md. |

[54] TRANSPORTING THERMAL ENERGY THROUGH A ROTATING DEVICE
12 Claims, 6 Drawing Figs.

[52] U.S. Cl. ................................................ 165/86,
60/39.51 R, 60/39.66, 165/105, 310/54, 310/57, 415/114, 416/96
[51] Int. Cl. ...................................................... F28d 11/02,
F28f 5/02
[50] Field of Search .......................................... 165/86,
105; 62/499; 310/54, 57; 60/39.51 R, 39.66;
416/96; 415/114

[56] References Cited
UNITED STATES PATENTS

| 2,327,786 | 8/1943 | Heintz............................ | 165/86 X |
| 2,799,259 | 7/1957 | Farny et al..................... | 165/86 X |
| 2,812,157 | 11/1957 | Turunen et al. ............... | 416/96 |
| 2,813,698 | 11/1957 | Lincoln.......................... | 165/105 X |

OTHER REFERENCES

Abbreviature: 118, 419, Sealed Cooling System For Turbo-Jet Engine, Newcomb, P. P. Sept., 1952, 60/39.66

*Primary Examiner*—Albert W. Davis, Jr.
*Attorney*—A. H. Caser

ABSTRACT: The invention provides for transporting heat through a sealed rotating device. It is of value for cooling rotating elements that are subject to heating, particularly elements that cannot be cooled by conventional means, such as the rotor of an enclosed motor or generator.

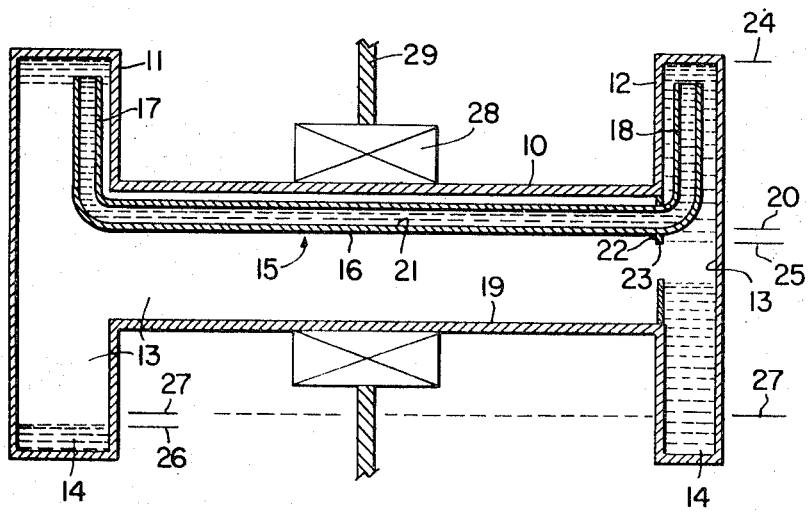
FIG. 1
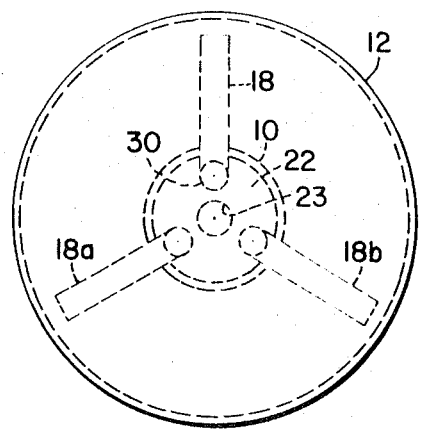
FIG. 2
FIG. 3
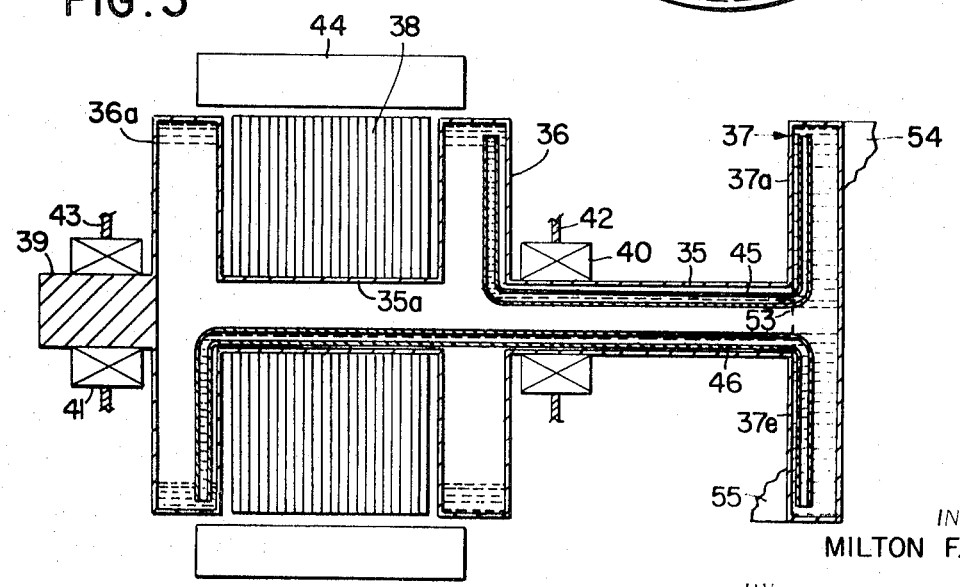
INVENTOR.
MILTON F. PRAVDA
BY A. H. Caser
ATTORNEY

TRANSPORTING THERMAL ENERGY THROUGH A ROTATING DEVICE

BACKGROUND OF THE INVENTION (1) The field of the invention comprises heat transfer devices. (2) So far as is known, the device herein described is new and its applications are new.

SUMMARY OF THE INVENTION

The hear transfer device comprises a hollow rotatable cylinder having a pair of spaced-apart hollow members thereon which rotate therewith. The cylinder and members have communicating interiors which together form a hermetically sealed space, and a heat transfer agent is present in the space in an amount to partially fill the same. On rotation of the device, the agent distributes itself on internal surfaces of the members. One of the members serves as an evaporator section in which the agent, in liquified form, is vaporized, and the other member serves as a condenser section in which the vapors are condensed. In steady state operation, vapors pass from the evaporator section, which is in heat exchange relation with a heated rotating body desired to be cooled, to the condenser section through the hollow cylinder, and condensed vapors pass back to the evaporator section through a syphon tube which extends through the hollow cylinder and connects the members. As the vapors are condensed in the condenser section, they give up latent heat of condensation which is then dissipated by the condenser section, and in this way the heated rotating body is continuously cooled by abstracting heat from it and dissipating it at a remote location. Heat flow through the cylinder takes place substantially isothermally by virtue of the isothermal evaporation-condensation cycle. The device provides a reliable heat transfer loop which does not require an external power source or means for circulating the agent, and because of its simplicity can be integrated directly into a body to be cooled.

BRIEF DESCRIPTION OF THE DRAWINGS

The invention in illustrated in the accompanying drawings, which are diagrammatic, and in which FIG. 1 is a central longitudinal sectional view through a device of the invention comprising a rotatable cylinder having a pair of hollow members thereon;

FIG. 2 is an end view of the right-hand end of FIG. 1;

FIG. 3 is a view like FIG. 1 but of a modified device and showing its incorporation in an electric motor;

DESCRIPTION OF THE SPECIFIC EMBODIMENTS

Figure 5:
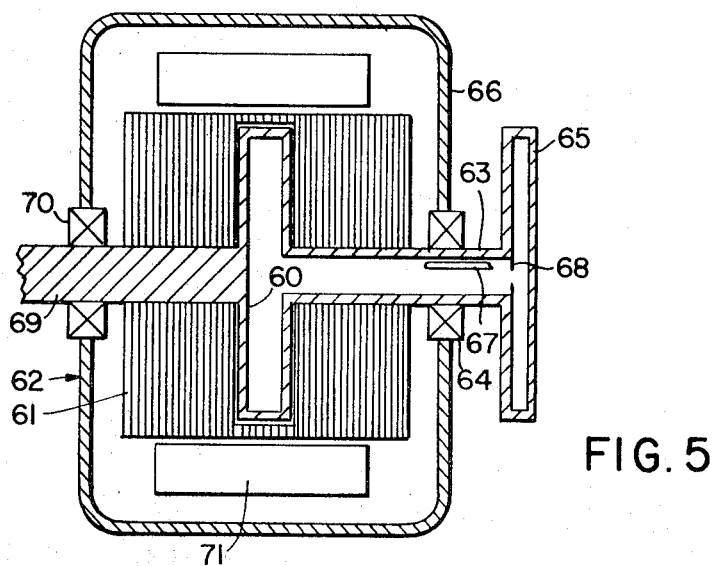
FIG. 5 is a view like FIG. 1 but showing another modification and its incorporation in an electric motor.

Referring to FIG. 1, the heat transfer device of the invention is shown in the form of a rotatable hollow cylinder 10 which is being rotated. It has a pair of axially spaced hollow members 11, 12 thereon which rotate with it, the former of which is wider than the latter. The cylinder and the members have communicating interiors which together form a hermetically sealed space 13, and a liquified heat transfer agent 14 partially fills the space, being shown as distributed in both members 11 and 12. As the device rotates, the rotation is imparted to the liquid owing to the frictional force existing between the liquid and the walls of the members, and as the rate of rotation increases to a point where said frictional force is greater than the force of gravity, the liquid tends to cling to the walls, especially the cylindrical walls, owing to the centrifugal force.

At this point, if heat is added to member 11, which represents the described evaporator section, and if heat is removed from member 12, which represents the described condenser section, the liquid within member 11 will form vapors. These vapors are at a slightly higher pressure than the agent in the condenser section 12, owing to the fact that their temperature is higher, and therefore there is a movement of vapors toward the condenser section via the hollow cylinder. As heat is being removed from the condenser section, the vapors condense therein, thereby providing a net interchange of thermal energy, in the form of latent heat of condensation (or latent heat of evaporation, which is equal thereto), between the evaporator and condenser sections.

In time, as described below, some of the liquid in the condenser section is forced back to the evaporator section. The pathway for this liquid is supplied by a syphon tube 15, whose operation is described below, but which can be seen to comprise a longitudinal portion 16 extending through cylinder 10, a leg 17 extending into member 11, and a leg 18 extending into member 12. At the evaporator section, the heat input continues, and vapors continuously form. Thus, a cyclic process is established wherein vapors continuously flow from the evaporator to the condenser sections, and condensed vapors flow from the condenser to the evaporator sections, and all the while thermal energy in the form of the described latent heat of condensation passes from the evaporator to the condenser sections as long as heat is added to the former and removed from the latter. The transfer of this latent heat of condensation takes place substantially isothermally since the evaporation and condensation processes are isothermal.

The operation of the syphon tube 15 may be set forth as follows. Let it be assumed, for convenience, that the heat transfer agent is present only in member 11 (although in use of the device it will be present in both members) and that the device is at rest. Upon rotation, the agent distributes itself, i.e., along the walls of the members 11 and 12. When heat is added to member 11 and removed from member 12, the agent in member 11 forms vapors and these pass along the cylindrical space 19 to member 12 where they condense. Gradually the amount of condensed vapors vapors or liquid in member 12 increases, and of course, it flows into the leg 18 of the syphon tube. But as long as such liquid does not fill the longitudinal portion 16 of the tube, no liquid will flow through the tube. When liquid flows into portion 16 from leg 18 and fills such portion, syphon action begins; the critical level which liquid in member 12 must reach is that indicated by line 20, which represents an extension of the level 21 in the portion 16. Means in the form of the barrier plate 22 prevents the liquid in member 12 from flowing into the space 19 of the cylinder 10. This plate is centrally apertured at 23 to permit vapors to pass from space 19 into member 12. It is apparent that the radial distance represented by the distance from line 24 to line 25 is larger than the distance represented by line 20 to line 24, and that therefore liquid will flow through the syphon tube before it will flow through the aperture 23. In fact, no liquid flow through the aperture is desired.

In member 11, the level of liquid just before syphoning action begins may be represented by line 26.

At steady state operation, i.e., after syphoning has started, the liquid level in member 12 will be identical to the liquid level in member 11 and may be represented by line 27. Thus, the level in member 12 will fall from a level between lines 20 and 25 to a level indicated by line 27. The amount of change in level in member 12 is determined by the relationship between the internal volumes of members 12 and 11. Essentially, therefore, member 12 becomes freer of liquid, and vapors can condense on the internal surfaces and transfer heat by condensation to the walls. In member 11, the level will have increased from the level at 26 by an amount represented by the difference between lines 26 and 27; this follows from the fact that the volume of member 11 is larger than the volume of member 12.

At 28 a bearing is shown on which the device may rotate, and at 29 is a wall which separates the heat input or heat receiving area from the heat output or heat dissipating area. Thus, the device may be positioned so as to bridge the two areas; and it may be employed primarily to cool one area, or to heat the other, although it will perform both functions. The areas may comprise gaseous or liquid environments, or even solid environments, and the environment in one area may be the same as or different from that in the other area. The bearing 28 tends to seal off one area from the other.

The driving force for the flow of vapors may be apparent from the fact that in the evaporator section the vapors are at a slightly higher pressure than in the condenser section; and the driving force for the flow of liquid is apparent from the fact that the liquid in the condenser section is subjected to centrifugal acceleration forces and to the syphon action. It should be noted that in the absence of the syphon tube, liquid would not flow from the condenser section as described.

It may be seen that the plate 22 is not only a barrier but also helps to support tube 15 is spaced relation to the cylinder 10, the tube passing through an opening 30 in the plate, note FIG. 2. The tube may be supported at its opposite end portion in any suitable way, although it may be noted that an apertured plate 22, or equivalent barrier means, is required only between the cylinder 10 and the condenser section 12 for it is at this point or junction that it is desired to prevent the flow of condensed vapors or liquid into cylinder 10. The syphon legs 17 and 18 may be of the same length, as shown, or of unequal lengths. While one syphon tube is operative, it is preferred as shown in FIG. 2 to use a plurality of tubes, in this case three tubes as indicated by the legs 18, 18a and 18b. The number of tubes may also be 2, or 4, 5, 6, etc., and an advantage of a plurality of tubes is to help secure a more balanced flow. The cross-sectional shape of the tubes is preferably round but other shapes are suitable. Similarly, the size of the tube cross section is variable and will be chosen to secure optimum operation of the device; preferably the size is as large as possible without interfering with the described operation.

While only one aperture 23 is shown in plate 22, more than one is feasible, such as 2, 3, 4, etc. Suitably, a plurality of apertures may be arranged in a ring in a central portion of the plate. The shape of the aperture or apertures is desirably circular but may be of other configuration, and the size should be coordinated with other described features to provide efficient operation. The location of the aperture or apertures should not, of course, impair the barrier function of the plate.

As indicated, the member 11 is wider than the member 12. An advantage of such a construction is that as liquid passes from member 12 to member 11 by syphon action, there will still be sufficient vapor space in member 11 to permit evaporation to go on. The amount of agent added to the device generally is just enough to fill the member 12, assuming that the device is inverted so as to rest on such member. More or less agent may be present, as note the example below, and the preferred amount may be determined in a trial run.

In FIG. 3, the device of the invention, in modified form, is incorporated in an electric motor where it functions to cool the heated rotor. The device comprises a rotatable hollow cylindrical 35 having hollow members 36 and 37 thereon which rotate with it. However, the cylinder has an extension 35a on the end of which another hollow member 36a is disposed. The members 36 and 36a are the evaporator sections and are located at each end of the rotor 38 of the motor. It will be seen that cylinder extension 35a serves as the motor shaft, and that cylinder 35 is a part of such shaft as is the solid cylinder portion 39 outwardly of member 36a. Bearings 40 and 41 support the cylinder 35 and portion 39 for rotation, the bearings extending from the motor housing 42, 43. The motor stator is at 44. Member 37, which serves as the condenser section, is modified over that of FIG. 1, being in the form of a group of individual chambers 37a, 37b, 37c, 37d, 37e, 37f, 37g, and 37h, note FIG. 4, which extend radially from cylinder 35. Each chamber is connected by a syphon tube to an evaporator section, the chambers 37a and 37e being shown as connected by tubes 45 and 46 to evaporator sections 36 and 36a, respectively, note FIG. 3. For the remaining chambers, tubes 47, 48, 49, 50, 51, and 52 are available, note FIG. 4. Half of the tubes return condensed vapors to evaporation section 36 and half to section 36a. The operation of the device is substantially as described for FIGS. 1 and 2. Vapor condenses in each hollow chamber independently of what is happening in the other chambers, and the return of the liquid is governed by the apertured plate 53.

Of particular interest is the fact that the radially arranged chambers collectively act as a fan, each serving as a fan blade, and by this means the dissipation of heat from the member 37 is improved. The fan action may be enhanced by attaching to the outer surface of each chamber a suitable shaped fan strip, one of which is partially shown at 54; or the strip may be attached to the inner surface of each chamber as indicated partly at 55.

Figure 4:
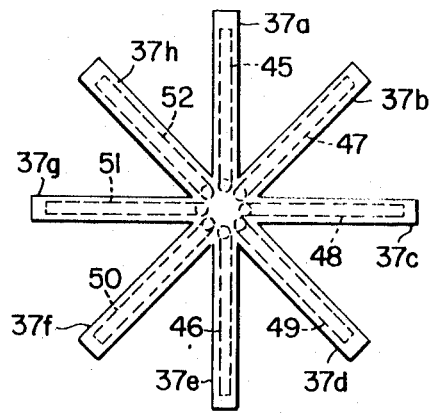
FIG. 4 is an end view of the right hand end of FIG. 3.

As illustrated by FIGS. 3 and 4, the device may have more than one evaporator section. It may also have more that one condenser section; thus a second condenser section may be located at the end of the shaft portion 39. As shown, the hollow cylinder 35 serves as a part of the motor shaft. The condenser is suitably spaced from the motor, and in fact is located outside the motor housing, in order to dissipate heat at a location remote from the rotor. It will be understood that the motor could also be a generator.

In FIG. 5 the heat transfer device, which is like that of FIGS. 1 and 2, has the evaporator section 60 embedded, so to speak, in the rotor 61 of motor 62. The device has a hollow cylinder 63 which is a part of the motor shaft, being supported on the bearing 64, and at its end it has a condenser section 65 disposed outside the motor housing 66. A syphon tube is partly shown at 67, and it will be understood that is has legs which extend into members 60 and 65. A plurality of tubes may be used. As apertured barrier plate is at 68. From the other side of evaporator section 60 a motor shaft portion 69 extends, and it is supported on bearing 70. The motor stator is at 71.

In FIG. 5 it is noteworthy that the evaporator section 60 is not only surrounded by the rotor 61, thus being in very good heat exchange relation therewith, but also such section is disposed very near to the circumference of the rotor, a place where heat tends to be formed in perhaps larger quantities than at any other location. This modification is also applicable to generators.

Figure 6:
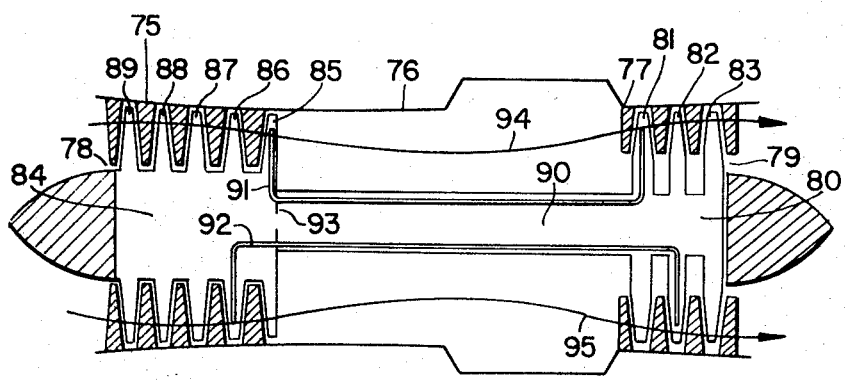
FIG. 6 is a central longitudinal view, in section, of another modified device incorporated in a gas turbine engine.

FIG. 6 illustrates the application of the invention to a gas turbine engine, wherein exhaust heat is used to heat incoming air. The engine is shown as comprising a forward air compressor 75, a central combustion chamber 76, and a turbine section 77. In normal operation, air enters the compressor 75 through air inlet 78 and is compressed by the compressor, then it is passed to the combustion chamber 76 75 burn the fuel, and the hot combustion gases are used to drive the turbine 77. Exhaust gases from the turbine are discarded the outlet at 79. In FIG. 6 the air and gas flows through the engine are represented by arrows 94 and 95; the fuel inlet to the chamber 76 is not shown.

According to the invention, rotor 80 of the turbine is hollow; for convenience, it is shown as having only three hollow blades 81, 82, and 83 although it may have many more; these blades function as the evaporator section of the heat transfer device. Rotor 84 of the compressor 75 is also hollow, and is shown as having five hollow blades 85, 86, 87, 88, and 89, although it may have more. Rotor 84 functions as the condenser section of the device. The two rotors are connected by the hollow cylinder 90, which serves as the rotating shaft of the engine. A syphon tube 91 connects the hollow blade 81 to the hollow blade 85, and another such tube 92 connects the blades 82 and 86. It will be understood that a syphon tube may join each hollow blade of the evaporator section to a hollow blade of the condenser section, although preferably the blades of the later stages of the turbine will be joined to blades of the later stages of the compressor. The specific stages to be joined may be determined by trial runs. At 93 is an apertured barrier plate.

The operation of the device of FIG. 6 is like that of the previously described devices. In effect, heat from the hot exhaust gases is transferred to the incoming air. The latter, it will be noted, is preheated after it has been compressed, and in this way extra thrust may be obtained from the engine for a given amount of fuel consumed.

Other heated rotating bodies may be cooled, such as a ball bearing, particularly the inner race of the same. This application of the invention may be visualized in connection with the device of FIG. 1 by considering that the inner bearing race is slipped over the evaporator section 11 so that the latter constitutes a shaft which rotates with the inner race. The outer race of the bearing and the bearing balls support the load. As the inner race rotates with section 11 and with the balls, heat is generated, owing to the friction taking place, and this heat is passed to section 11 where it is dissipated in the manner described, i.e., the heat is taken up by the evaporator section 11, transferred by means of the agent 14 to the condenser section 12, and there dissipated.

In appropriate cases, the surfaces of the evaporator section of the device of the invention, preferably the internal surfaces thereof, may be provided with heat receiving aids, such as fins, to increase the heat receiving area of such surfaces. These aids should not, of course, interfere with the disposition of the section in a given application of the device. Similarly, aids may also be present on the surfaces of the condenser section.

The heat transfer agent includes practically any organic or inorganic liquid, or a molten salt, or a molten metal; some examples are hydrocarbons, fluorinated and chlorinated hydrocarbons, acetone and other ketones, methanol, glycerin and other alcohols, water, molten sodium chloride, molten metals like sodium, cesium, potassium, lead, bismuth, etc. The agent should not be corrosive or decompose at operating temperatures. It should, of course, be chosen to correspond to the expected temperature level, and a trail run or two may be used to help in the selection.

The invention may be illustrated by the following example.

EXAMPLE

A heat transfer device essentially like that shown in FIGS. 1 and 2 was fabricated and tested to verify its operation. The hollow cylinder and the evaporator and condenser sections were made of 1/16-inch thick steel. The diameter of these sections was 5 inches, the condenser had a width of 0.40 inch, and the evaporator had a width of 1⅛ inches. The volume of the condenser was purposely made small, compared to that of the evaporator, so that only a small quantity of agent would be necessary to fill the condenser at startup and so that, after syphoning started, the depth of agent in the two sections would not be very great. The latter condition would permit most of the area of the sidewalls of the condenser at act as condensing surfaces. Dowtherm "E," comprising orthodichlorobenzene, m. −17° C., b. 179° C., was used as the heat transfer agent in an amount of 90 cc., which was sufficient to fill the condenser and the syphon tubes and to provide a small amount in the evaporator. However, the agent was added to the evaporator, so that at startup it contained all of the agent. During the test, the device was so disposed that the axis of rotation was in a horizontal plane. The syphon tubes were of ⅛-inch diameter stainless steel. A small diameter was chosen for the tubes to insure that the horizontal portion of each tube would be filled with agent.

"Tempilaq" coatings were places on the evaporator and condenser surfaces, and on the hollow cylinder surfaces, at various positions to determine their temperatures during operation. These coatings, which are available for a series of temperatures, melt at specified temperatures, each being color coded to identify its melting point. The coatings used had the following melting points: 225°, 250°, 275°, 300°, and 325° F.

The device was rotated at about 150 r.p.m., which was fast enough to distribute the agent on internal cylindrical surfaces of the device, as described above, but slow enough to observe, visually and by touch, the events occuring during operation.

The outer cylindrical surfaces of the evaporator were heated with a gas torch while the condenser surfaces were cooled by means of a stream of air issuing from a fan on the back side of the condenser. The temperature was kept at about 225° F. during the startup procedure, and in this interval the condenser was observed to fill with agent, a fact indicated by the cooling of its surfaces as felt by hand. With the condenser filled, its sidewalls cannot act as condensing surfaces, and thus the only heat transmitted is by conduction through the walls and the agent.

Then the condenser was observed to become hot to the touch (temperature approximately 225° F.), and this indicated that syphoning action was taking place and that agent was passing back to the evaporator. In time, the condenser became nearly empty, the side walls were able to act as condensing surfaces, and the cylinder and condenser became isothermal.

Then the evaporator temperature was increased to about 325° F., and the condenser was able to follow this temperature rise, the steps being as described. By means of the "Tempilaq" coatings it was observed that the inner and outer diameters of the condenser became isothermal at the higher temperature, a further indication that syphoning was taking place.

From the foregoing, it is apparent that the device is operative and that it is self-starting.

It will be understood that the invention is capable of obvious variations without departing from its scope.

In the light of the foregoing description, the following is claimed:

1. A rotatable heat transfer device for transporting thermal energy comprising a rotatable hollow cylinder, a pair of axially spaced hollow members on the cylinder which rotate therewith, said cylinder and members having communicating hollow interiors which together form a hermetically sealed space, a heat transfer agent in said space in an amount to partially fill the same, one of said members serving as an evaporator section in which said agent, in liquified form, is vaporized and the other member serving as a condenser section in which said vapors are condensed, at least one syphon tube having a longitudinal portion extending through the interior of the cylinder and having at each end a leg which extends into each member, said cylinder acting to pass vapors from the evaporator section to the condenser section and said tube passing condensed vapors from the condenser section to the evaporator section, means in said sealed space for preventing the flow of condensed vapors into said cylinder, said cylinder and members being rotatable at a rotational velocity sufficient to distribute the agent over the internal surfaces of said members, said evaporator section receiving heat to vaporize the agent therein and the resulting vapors passing through said hollow cylinder to said condenser section and there condensing to give up latent heat of condensation, said condensed vapors, after steady state operation is reached, passing from the condenser section through said syphon tube to the evaporator section, and said condenser section acting to dissipate said heat.

2. Device of claim 1 wherein a plurality of syphon tubes are present.

3. Device of claim 1 wherein said means comprises a plate interposed between said cylinder and the condenser section.

4. Device of claim 1 wherein said evaporator section is adapted to be placed in heat exchange relation with a heated rotating body which is to be cooled.

5. Device of claim 1 wherein initially said condensed vapors accumulate in the condenser section and are prevented from passing into the hollow cylinder by said means, and wherein said condensed vapors flow through said syphon tube continuously after first filling up said leg in the condenser section and the longitudinal portion of the tube in the hollow cylinder.

6. Device of claim 4 wherein said evaporator section is in heat exchange relation with the heated rotor of an electric motor or generator and receives heat therefrom, said rotatable hollow cylinder comprises at least a part of the shaft of said motor or generator, and wherein said condenser section is disposed outwardly of a housing for the motor or generator in order to dissipate heat therefrom.

7. Device of claim 8 wherein a second evaporator section is present, axially spaced from said first-mentioned one, said evaporator sections being disposed at each end of the rotor and in heat exchange relation therewith.

8. Device of claim 7 wherein said condenser section is in the form of a group of individual chambers which extend radially from said cylinder, each said chamber being connected to one of said evaporator sections by a syphon tube, and said group of chambers acting as a fan to dissipate heat.

9. Device of claim 8 wherein said evaporator section is embedded in said rotor and is of a diameter almost equal to the rotor diameter.

10. Device of claim 4 wherein said evaporator section is in heat exchange relation with the heated turbine section of a gas turbine engine and receives heat therefrom, said rotatable hollow cylinder comprises at least part of the shaft of said engine, and wherein said condenser section is in heat exchange relation with the compressor section of said engine.

11. Device of claim 10 wherein said evaporator section comprises a plurality of stages, said condenser section comprises a plurality of stages, and wherein a plurality of syphon tubes are present each connecting a stage of the evaporator section with a stage of the condenser section.

12. A rotatable heat transfer device for transporting thermal energy comprising a rotatable hollow cylinder, and an evaporator section and a condenser section on said cylinder axially spaced from each other and rotatable with the cylinder, a heat transfer agent in said device which is vaporizable in the evaporator section and condensable in the condenser section, said cylinder acting to conduct vapors from the evaporator section to the condenser section, at least one syphon tube in the device extending from the condenser section through said cylinder to the evaporator section and serving to conduct condensed vapors back to the evaporator section, and means disposed between the condenser section and said cylinder for barring the flow of said condensed vapors into said cylinder.

\* \* \* \* \*

UNITED STATES PATENT OFFICE
CERTIFICATE OF CORRECTION

Patent No. 3,621,908         Dated November 23, 1971

Inventor(s) Milton F. Pravda

It is certified that error appears in the above-identified patent and that said Letters Patent are hereby corrected as shown below:

Column 2, line 36, cancel "vapors", second occurrence. Column 3, line 14, "is spaced" should read -- in spaced -- ; line 37, "aperture of apertures" should read -- aperture or apertures -- . Column 4, line 29, "is has legs" should read -- it has legs -- ; line 31, "As" should read -- An -- ; line 48, "75" should read -- to -- ; line 50, after "discarded" insert -- through -- . Column 5, line 34, "trail" should read -- trial -- ; line 51, "at act" should read -- to act -- . Column 7, line 1, "claim 8" should read -- claim 6 -- ; line 2, cancel the comma after "present"; line 10, "claim 8" should read -- claim 6 -- .

Signed and sealed this 31st day of October 1972.

(SEAL)
Attest:

EDWARD M. FLETCHER, JR.         ROBERT GOTTSCHALK
Attesting Officer                 Commissioner of Patents